United States Patent
Ohta et al.

(10) Patent No.: US 7,214,249 B2
(45) Date of Patent: May 8, 2007

(54) METHOD FOR CONDUCTING ELECTRIC ACTIVATION OF ELECTRIC DOUBLE LAYER CAPACITORS

(75) Inventors: Hidetoshi Ohta, Kanagawa (JP); Keiichi Hayashi, Kanagawa (JP); Takashi Tanikawa, Kanagawa (JP); Atsushi Shimizu, Kanagawa (JP)

(73) Assignee: Power Systems Co., Ltd., Kanagawa (JP)

( * ) Notice: Subject to any disclaimer, the term of this patent is extended or adjusted under 35 U.S.C. 154(b) by 0 days.

(21) Appl. No.: 11/499,801

(22) Filed: Aug. 4, 2006

(65) Prior Publication Data

US 2007/0032031 A1 Feb. 8, 2007

(30) Foreign Application Priority Data

Aug. 5, 2005 (JP) ............................. 2005-227877

(51) Int. Cl.
*H01G 9/02* (2006.01)
(52) U.S. Cl. ...................................... 29/25.03; 361/502
(58) Field of Classification Search ............... 29/25.03; 361/502–504
See application file for complete search history.

(56) References Cited

U.S. PATENT DOCUMENTS 6,352,565 B2 * 3/2002 Suhara et al. ............... 29/25.03

FOREIGN PATENT DOCUMENTS

| JP | 11-317333 | 11/1999 |
| JP | 2000-077273 | 3/2000 |
| JP | 2000-277397 | 10/2000 |
| JP | 2001-223143 | 8/2001 |
| JP | 2002-025867 | 1/2002 |

OTHER PUBLICATIONS

Michio Okamura "Electric Double Layer Capacitors and Power Storage Systems" 2nd Edition The Nikkan Kokyo Shimbun, Ltd., 2001, pp. 34 to 37.
Takeuchi Yasushi "Porous Materials: Characterization, Production and Application", Fujitec Corp., 1999, pp. 56-61.

* cited by examiner

*Primary Examiner*—H. Jey Tsai
(74) *Attorney, Agent, or Firm*—Harness, Dickey & Pierce, PLC

(57) ABSTRACT

An object of the present invention is to provide a method for conducting electric activation of an electric double layer capacitor, the method making it possible to increase the electrostatic capacitance and to decrease the internal resistance. The method is for conducting electric activation of an electric double layer capacitor in which nonporous carbonaceous electrodes containing graphite-like fine crystalline carbon are soaked in an organic electrolytic solution. The method at least comprises: charging the electric double layer capacitor at a constant current until the interelectrode voltage reaches a predetermined voltage which is not lower than the electrostatic capacitance developing voltage but lower than the rated voltage; conducting constant voltage charging for a predetermined time during which ions of solutes in the organic electrolytic solution are conceived to be adsorbed uniformly on the surface of the fine crystalline carbon at that predetermined voltage.

7 Claims, 4 Drawing Sheets

METHOD FOR CONDUCTING ELECTRIC ACTIVATION OF ELECTRIC DOUBLE LAYER CAPACITORS

BACKGROUND OF THE INVENTION

1. Field of the Invention

The present invention relates to a method for conducting electric activation of electric double layer capacitors in which nonporous carbonaceous electrodes are soaked in an organic electrolytic solution, and particularly to a method for conducting electric activation of electric double layer capacitors which show a behavior such that the electrostatic capacitance increases as the capacitors experience a voltage.

2. Description of the Related Art

Capacitors can repeat charging and discharging with a big electric current and, therefore, are promising as devices for electric power storage with high charging-and discharging frequency. Capacitors are, therefore, hoped to be improved in energy density, rapid charging/discharging characteristics, durability, etc.

The fact that carbonaceous electrodes are soaked in an organic electrolytic solution to form electric double layer capacitors is known. Michio Okamura "Electric Double-layer Capacitors and Power Storage Systems" 2nd Edition, The Nikkan Kogyo Shimbun, Ltd., 2001, pages 34 to 37 discloses an electric double layer capacitor comprising a bath partitioned into two sections with a separator, an organic electrolytic solution filled in the bath and two carbonaceous electrodes, one electrode being soaked in one section of the bath and the other electrode being soaked in the other section of the bath. The organic electrolytic solution is a solution containing a solute dissolved in an organic solvent. Tetraethylammonium tetrafluoroborate ($Et_4NBF_4$) or the like are disclosed as solutes and propylene carbonate is disclosed as a solvent. As the carbonaceous electrodes, activated carbon is employed. The activated carbon refers to shapeless carbon which has a veil, large specific surface area because it has innumerable fine pores. In the present specification, shapeless carbon having a specific surface area of about 1000 $m^2/g$ or more is referred to as activated carbon.

Japanese Patent Laid-open Publication No. H11(1999)-317333 discloses a nonporous carbonaceous material as carbonaceous electrodes for use in electric double layer capacitors. The carbonaceous material comprises fine crystalline carbon similar to graphite and has a specific surface area of 300 $m^2/g$ or less, which is smaller than that of activated carbon. Nonporous carbonaceous electrodes generate electrostatic capacitance in a mechanism completely different from that of carbonaceous electrodes made of activated carbon. It is believed that application of voltage makes electrolyte ions intercalated with solvent between layers of graphite-like fine crystalline carbon, resulting in formation of an electric double layer.

Japanese Patent Laid-open Publication No. 2002-25867 discloses production of carbonaceous electrodes using needle coke or infusibilized pitch as a raw material. The needle cole refers to easily graphitizable calcined coke with well-developed needle crystals. Needle coke has a very high electrical conductivity and a very low coefficient of thermal expansion, and also has a high anisotropy based on its graphite crystal structure. Generally, needle coke is produced by a delayed coking process using specially-treated coal tax pitch or petroleum-derived heavy oil as a raw material.

Japanese Patent Laid-open Publication No. 2000-77273 discloses an electric double layer capacitor including nonporous carbonaceous electrodes soaked in an organic electrolytic solution. The organic electrolytic solution must have ion conductivity, and therefore the solute is a salt composed of a cation and an anion combined together.

The cations disclosed include lower aliphatic quaternary ammonium such as tetraethylammonium, tetrabutylammonium and triethylmethylammonium; lower aliphatic quaternary phosphonium such as tetraethylphosphonium; and imidazolium derivatives. As the anion, tetrafluoroboric acid, hexafluorophosphoric acid and the like are disclosed. The solvent of the organic electrolytic solution is a polar aprotic organic solvent. Specifically, ethylene carbonate, propylene carbonate, γ-butyrolactone, sulfolane and the like are disclosed.

An electric double layer capacitor including nonporous carbonaceous electrodes soaked in an organic electrolytic solution exhibits a charging/discharging characteristics different from that of capacitors using activated carbon as carbonaceous electrodes. The charging/discharging characteristics is described in Michio Okamura "Electric Double-layer Capacitors and Power Storage Systems" 2nd Edition, The Nikkan Kogyo Shimbun, Ltd. 2001, pages 77 to 81. FIG. 1 is a graph showing one example of the behavior in which voltage changes with time when charging and discharging at a constant current are applied repeatedly to that type of the electric double layer capacitors (quoted from Michio Okamura "Electric Double-layer Capacitors and Power Storage Systems" 2nd Edition, The Nikkan Kogyo Shimbun, Ltd., 2001, page 81, FIG. 3–15).

In the charging/discharging curve of FIG. 1, the voltage stands up within a short period of time in the first constant current charging started from 0 V, and the voltage increment becomes slow at around 2.2 V. In other words, the slope (dv/dt) is substantially constant before around 2.2 V, decreases quickly at around 2.2 V, and again is substantially constant after around 2.2 V.

In a constant current charging curve, an electrostatic capacitance corresponds to the slope of the curve. High slope values mean low electrostatic capacitances, and low slope values mean high electrostatic capacitances. So the initial charging curve of FIG. 1 shows that the electrostatic capacitance is small in an early stage of charging and that an electrostatic capacitance substantially starts to develop at around 2.2 V.

On the other hand, in the second and subsequent charging processes, the voltage increases monotonously and a constant electrostatic capacitance is obtained from the early stage of charging like conventional activated carbon electrodes. In other words, when this type of the electric double layer capacitors are first allowed to experience a voltage, the electrostatic capacitance of the capacitor increases and a large capacitance is successfully obtained.

Japanese Patent Laid-open Publication No. 2000-277397 and Japanese Patent Laid-open Publication No. 2001-223143 disclose methods for conducting electric activation of electric double layer capacitors. "Electric activation" means a first charging treatment of an electric double layer capacitor, namely, a process in which a polarizing electrode is first allowed to experience a voltage. This expression is used because the first charging treatment is considered to serve as activation by which an electrostatic capacitance is developed. These documents disclose that the electric capacitance of an electric double layer capacitor is increased through optimization of conditions for electric activation.

FIG. 2 is a graph showing one example of a charging/discharging curve of an electric double layer capacitor in a conventional electric activation method. In this method, an electric double layer capacitor is first subjected to a constant current charging until the interelectrode voltage reaches a predetermined voltage which is not lower than the rated voltage but is not higher than the decomposition voltage of the electrolytic solution, and then a constant voltage charging is conducted for a certain period of time. After a constant current discharging is conducted, charging/discharging is conducted under the rated current and the rated voltage.

However, for practical use as an auxiliary power source of electromobiles, batteries and power plants, electric double layer capacitors are demanded to have increased performances.

SUMMARY OF THE INVENTION

The present invention intends to solve the aforementioned existing problems. The object of the present invention is to provide a method for conducting electric activation of an electric double layer capacitor, the method making it possible to increase the electrostatic capacitance and to decrease the internal resistance.

The present invention provides a method for conducting electric activation of an electric double layer capacitor comprising:

providing an electric double layer capacitor in which nonporous carbonaceous electrodes containing graphite-like fine crystalline carbon are soaked in an organic electrolytic solution;

charging the electric double layer capacitor at a constant current until the interelectrode voltage reaches a predetermined voltage which is not lower than the electrostatic capacitance developing voltage but lower than the rated voltage;

conducting constant voltage charging for a predetermined time during which ions of solutes in the organic electrolytic solution are conceived to be adsorbed uniformly on the surface of the fine crystalline carbon at that predetermined voltage;

conducting constant current charging until the interelectrode voltage reaches a predetermined voltage which is not lower than the rated voltage but is not higher than the decomposition voltage of the electrolytic solution; and conducting constant voltage charging for a predetermined time during which ions of solutes in the organic electrolytic solution are conceived to be inserted uniformly to between layers of the fine crystalline carbon at that predetermined voltage. This can attain the above-mentioned object.

According to the present invention, a remarkable effect is obtained. Namely, the method of the invention can increase the electrostatic capacitance density and can decrease the internal resistance in comparison to conventional methods even if the same type of the carbonaceous electrodes are used.

DETAILED DESCRIPTION OF THE PREFERRED EMBODIMENTS

Figure 1:
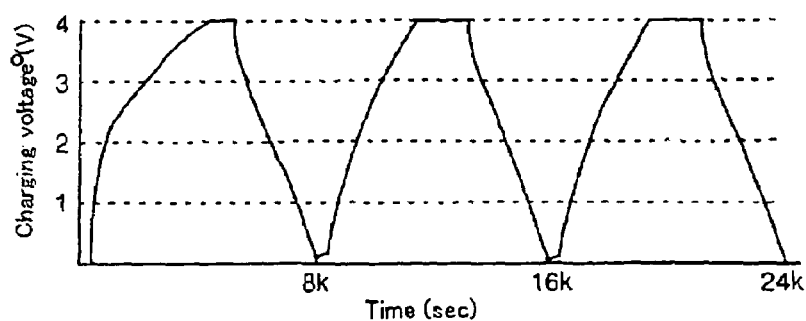
FIG. 1 is a graph showing one example of the behavior in which voltage changes with time when constant current charging and discharging are applied repeatedly to an electric double layer capacitor in which nonporous carbonaceous electrodes are soaked in an organic electrolytic solution.
Figure 2:
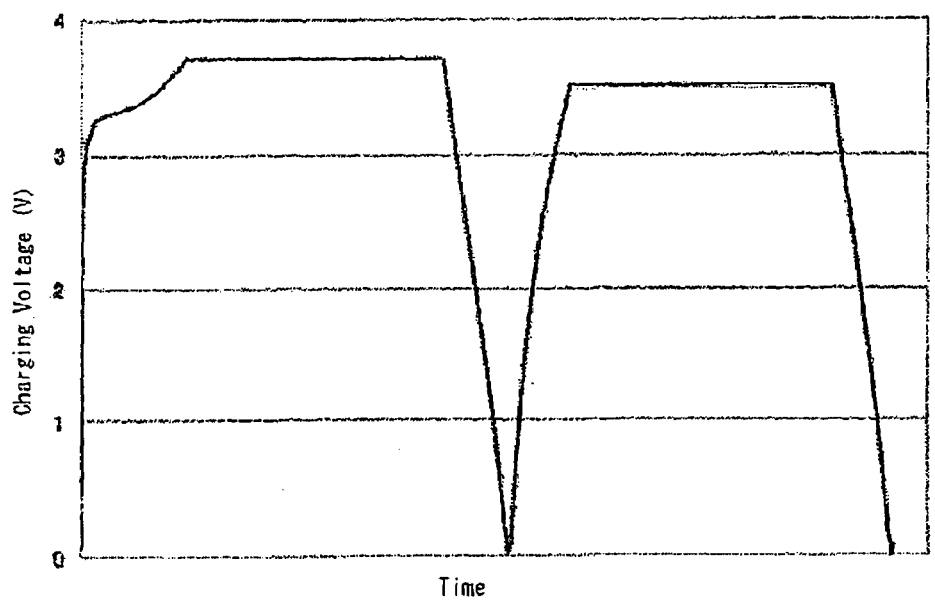
FIG. 2 is a graph showing one example of a charging/discharging curve of an electric double layer capacitor in a conventional electric activation method.

For electric double layer capacitors including nonporous carbonaceous electrodes soaked in an organic electrolytic solution, electric activation has been applied. In such a treatment, a constant current charging is conducted first until the interelectrode voltage reaches a predetermined voltage which is not lower than the rated voltage but is not higher than the decomposition voltage of the electrolytic solution, and then a constant voltage charging is conducted for a penrod of time until the relaxation current becomes sufficiently small at the predetermined voltage.

The "rated voltage" as used herein means a voltage used for charging an electric double layer capacitor at the time of practical use thereof. The charging of an electric double layer capacitor at the time of practical use thereof is performed through a circuit controlling the current and the voltage so as not to impair the working life or characteristics of the electric double layer capacitor. The certain voltage controlled in this way is the rated voltage as used herein. When using an organic electrolytic solution, the rated voltage is typically about 2 to 4 V. For example, in the constitutions shown in the working examples of the present invention, the rated voltage is about 3.5 V. The certain current amount which is controlled together with the voltage is called a rated current.

The "decomposition voltage of an electrolytic solution" means a voltage (a potential window of the solvent) at which electrochemical decomposition of the electrolytic solution is started as a result of increase in interelectrode current. The decomposition voltage of an electrolytic solution varies depending upon the types of the solvent, solute and electrodes to be used. It can be determined through a withstand voltage experiment. When using an organic electrolytic solution, the decomposition voltage of the electrolytic solution is typically about 3 to 4.5 V. For example, in the constitutions shown in the working examples of the present invention, the decomposition voltage of the electrolytic solution is about 4.2 V.

In the method for conducting electric activation of the present invention, an electric double layer capacitor is caused to experience a voltage in steps. Specifically speaking, constant current charging is once stopped at arrival at a voltage lower than the above-mentioned predetermined voltage used in conventional electric activation methods. Then, constant voltage charging is conducted and, subsequently, constant current charging is conducted until the voltage reaches the above-mentioned predetermined voltage. The step of constant current charging and the step of constant voltage charging may be done twice or more times. Although the reason is not clear, it is conceivable that when a voltage is applied slowly, pits are marked in the surface of a polarizing electrode (pit-marking), and when a constant current charging is conducted until arrival at the above-mentioned voltage, adsorption sites are formed with respect to the pits and the efficiency of the adsorption site formation increases. In conventional electric activation method, it is conceivable that constant current charging is continued until arrival at the above-mentioned predetermined voltage without once stopping constant current charging at arrival at a voltage lower than the above-mentioned predetermined voltage and, therefore, electric activation easily proceeds at the sites where adsorption sites formed once and, as a result, adsorption sites are formed deviatedly.

When constant current chalking is conducted, the amount of electric current is made to the same as that used in conventional electric activation methods. The amount of electric current is preferably not larger than the rated current. The "rated current" is the amount of electric current used for charging at the time of practical use of an electric double layer capacitor, as stated previously. The rated current is determined on the basis of internal resistance. However, the activation current in an electric activation step must be sufficiently small because the internal resistance is not determined before the electric activation. However, if the activation current is made too small, it is impossible to use the current sufficiently due to the effects of IR drop, etc. A specific example of the rated current is from 0.1 to 10 mA/cm$^2$, and preferably from 0.2 to 5 mA/cm$^2$. If the amount of electric current used in the constant current charging exceeds the rated current, the electric activation does not proceed sufficiently mainly in the depth direction because the electric activation tends to become uneven.

The amount of electric current used in the constant current charging is preferably ½ or less of the rated current. The amount of electric current used in the constant current charging is concretely approximately from 0.4 to 3 mA/cm$^2$, and preferably approximately from 0.6 to 2 mA/cm$^2$.

The voltage at which the constant current charging is stopped is a predetermined voltage which is not lower than the electrostatic capacitance developing voltage but lower than the rated voltage. The upper limit of the predetermined voltage is preferably the rated voltage minus 0.1 V or 0.2 V, more preferably the rated voltage minus 0.4 V.

The "electrostatic capacitance developing voltage" means the voltage at which an electrostatic capacitance starts to develop in the first constant current charging of the electric double layer capacitors, and it is indicated by a sign "Ve." Development of the electrostatic capacitance is shown as a point at which the charging curve starts departing from the imaginary straight line corresponding to the initial voltage uprising from 0V in the first constant current charging curve. However, there is a case where the point is hard to be read clearly dependent on the shape of the constant current charging curve.

In such a case, constant current and constant voltage (CCCV) charging step under predetermined charging conditions be conducted, and the electrostatic capacitance of the electric double layer capacitors may be considered to be developed when voltage changes per unit charging time, that is, the slope (dV/dt) becomes not more than 0.005 in the course of the CCCV charging curve. In this case, the electrostatic capacitance developing voltage (Ve) is the voltage value at which the slope initially becomes 0.005. The predetermined charging conditions are a charging current of 1 mA/cm$^2$ and the like as conducted in the working examples Ve may be determined through a preliminary measurement process because it is inherent to the carbonaceoxis material employed. If the predetermined voltage is not lower than the rated voltage, the internal resistance of the electric double layer capacitors may increase. If the predetermined voltage is lower than Ve, the electrostatic capacitance will be improved insufficiently. The predetermined voltage is, for example, a voltage within the range of from 2.2 V to 3.4 V, and preferably within the range of from 2.4 V to 3.3 V.

The constant voltage charging is conducted for a predetermined time during which ions of solutes in the organic electrolytic solution are conceived to be adsorbed uniformly on the surface of the fine crystalline carbon. The predetermined time is typically from 60 to 10800 seconds, and preferably from 300 to 3600 seconds. If the time of the constant voltage charging is too short, the electrostatic capacitance will be improved insufficiently.

Then, constant current charging is performed again. The amount of electric current used in the constant current charging is determined as mentioned above. The amount of electric current may be the same as that used in the first constant current charging or alternatively may be varied appropriately. The constant current charging is conducted until the interelectrode voltage reaches a predetermined voltage which is not lower than the rated voltage but is not higher than the decomposition voltage of the electrolytic solution. The upper limit of the predetermined voltage is, for example, the rated voltage plus 0.7 V, or the rated voltage plus 0.2 V. If the predetermined voltage is out of the above-mentioned range, the electrostatic capacitance will be improved insufficiently. The predetermined voltage is, for example, a voltage within the range of from 3.5 V to 4.2 V, and preferably within the range of from 3.6 V to 4 V.

Subsequently, constant voltage charging is conducted again at the above-mentioned predetermined voltage. The constant voltage charging is conducted for a predetermined time during which ions of solutes in the organic electrolytic solution are conceived to be inserted uniformly to between layers of the fine crystalline carbon. The predetermined time is typically from 1800 to 28800 seconds, and preferably from 3600 to 25200 seconds. If the time of the constant voltage charging is too short, the electrostatic capacitance will be improved insufficiently. If too long, the internal resistance will become high.

After the constant voltage charging is completed, discharging is performed in a usual way. For example, constant current discharging may be conducted. Then, charging operations mentioned below may be further performed because it is conceivable that such operations can stabilize the activation.

That is, constant current charging is conducted at the rated voltage until the interelectrode voltage reaches the rated voltage and then constant voltage charging is conducted at the rated voltage. The constant voltage charging is continued for a predetermined time which seems enough to stabilize the activation. The predetermined time is typically from 60 to 3600 seconds.

Electric double layer capacitors to which the electric field activating method of the present invention can be applied are electric double layer capacitors which show a behavior in which the electrostatic capacitance increases as the electric double layer capacitor experiences a voltage, and typically are electric double layer capacitors including nonporous carbonaceous electrodes soaked in an organic electrolytic solution.

Nonporous carbonaceous electrodes are polarizing electrodes fabricated using nonporous carbon as an active component. Preferable nonporous carbon is a carbon powder produced by calcinating a carbon source material at 500 to 900° C. for 2 to 4 hours under an inert atmosphere, and then heat-treating in the presence of an alkali hydroxide powder and/or alkali metal. As the carbon source material, coke green powder, mesophase carbon, infusibilized vinyl chloride, etc. may be used.

When petroleum heavy oil obtained during distillation of petroleum is subjected to high temperature pyrolysis, a carbonaceous solid with a needle-like structure is obtained. This solid immediately after generation is called green needle coke. When used as filler or the like, it is further calcined at a temperature of 1000° C. or higher. The calcined product is called calcined needle coke, which is distinguished from green needle coke. In this specifications, powdery green needle coke is called a needle coke green powder.

For producing nonporous carbonaceous electrodes, it is preferable to use a needle coke green powder as a starting material. Needle coke green powders are easily crystallized even by calcination at relatively low temperatures. Therefore, it is easy to control the ratio of amorphous portions to crystalline poisons. Easily graphitizable organic substances are converted into a highly oriented structure through heat treatment and they are easily crystallized even by calcination at relatively low temperatures. Therefore, it is easy to control the ratio of amorphous portions to crystalline portions.

Needle coke green powders are usually produced using petroleum pitch as a raw material. In the present invention, however, coal-origin needle coke green powders produced by removing insolubles in quinolin from a soft pitch of coal and carbonizing the purified raw material may be used. Coal-origin needle coke generally is characterized by a high true specific gravity, a low coefficient of thermal expansion, a needle-like structure and being soft. In particular, it is characterized by a coarser particle size and a lower coefficient of thermal expansion in comparison to petroleum-origin needle coke. Both types of needle cokes are different also in element composition. Contents of sulfur and nitrogen of coal-origin needle coke are lower than those of petroleum-origin needle coke (see Yasushi Takeuchi "Porous materials characterization, production and application" Fujitec Corp., pages 56 to 61, 1999).

In the production of carbonaceous electrodes to be used in the present invention, a needle coke green powder is prepared first. The central particle diameter of the raw material is from 10 to 5000 μm, and preferably from 10 to 100 μm. Ash in a carbonaceous electrode influences generation of a surface functional group and, therefore, it is important to diminish the content thereof. The needle coke green powder to be used in the present invention is characterized by inclusion of from 70 to 98% of fixed carbon and from 0.05 to 2% of ash, and preferably from 80 to 95% of fixed carbon and 1% or less of ash.

A needle coke green powder is calcined under an inert atmosphere, for example, an atmosphere of nitrogen or argon, at 500 to 900° C., preferably 600 to 800° C., and more preferably 650 to 750° C. for 2 to 4 hours. It is conceivable that a crystal structure of carbon tissue is formed during this calcination process.

If the calcination temperature is lower than 500° C., pores will grow too much through activation treatment, whereas if it is over 900° C., activation will not progress. The calcination time essentially has no effects on the reaction. When, however, it is approximately less than 2 hours, heat is not transferred throughout the reaction system and, therefore, uniform nonporous carbon is not formed. On the other hand, calcination of 4 hours or longer causes no benefits.

The calcined carbon powder is mixed with from 1.8 to 2.2 times, preferably about 2 times, in weight, of alkali hydroxide. Subsequently, the resulting mixture powder is calcined under an inert atmosphere at 650 to 850° C., preferably at 700 to 750° C. for 2 to 4 hours. This process is called alkali activation and is believed to have an effect of relaxing the crystal structure of carbon through permeation of vapor of alkali metal atoms into carbon tissue.

When the amount of the alkali hydroxide is less than 1.0 time, activation does not progress sufficiently and a capacitance will not develop at the first charging. When the amount of the alkali hydroxide is over 2.5 times, the surface area tends to increase due to too much progress of activation and the surface condition will become the same as that of normal activated carbon. It, therefore, will become difficult to take a withstand voltage. KOH, CsOH, RbOH and the like may be used as the alkali hydroxide. KOH is preferred because it shows excellent activation effects and it is inexpensive.

When the calcination temperature is lower than 650° C., the effect of loosening the carbon layers is diminished due to insufficient permeation of KOH into carbon and, therefore, it is difficult to develop an increase in capacitance at the first charging. When the calcination temperature is higher than 850° C., opposite actions, namely, activation by KOH and crystallization of base carbon, will occur simultaneously and, therefore, it will become difficult to control the activation. The calcination time has no substantial meaning as long as the material is fully heated. If, however, the calcination time is shorter than 2 hours, heat is not distributed sufficiently in the material and some portions are allowed to remain unactivated. On the other hand, calcination of 4 hours or longer causes no benefits.

Subsequently, the resulting mixture powder is washed to remove alkali hydroxide. The washing can be conducted, for example, by recovering particles from the carbon after the alkali treatment, filling the articles in a stainless steel column, introducing compressed steam at a temperature of from 120° C. to 150° C. and a pressure of from 10 to 100 kgf, preferably from 10 to 50 kgf into the column, and continuing the introduction of compressed steam until the pH of the waste water becomes about 7 (typically 6 to 10 hours). After the completion of the alkali removing step, an inert gas such as argon anal nitrogen is allowed to flow in the column for drying. Thus, a desired carbon powder is obtained.

The carbon powder obtained via the above-mentioned steps has a specific surface area of 300 $m^2/g$ or less. This is classified into so-called "nonporous carbon", which has few pores large enough to capture electrolyte ions, solvent, $CO_2$ gas and the like therein. The specific surface area can be determined by the BET method using $CO_2$ as an adsorbent.

However, a carbon powder prepared in such a manner using a needle coke green powder as a raw material is not mere "nonporous carbon" and it has some pores. The carbon powder to be used in the present invention has a volume of pores with a pore diameter of 0.8 nm or less of from 0.01 to 0.1 ml/g, and preferably from 0.02 to 0.06 ml/g.

If the volume of pores with a pore diameter of 0.8 nm or less is less than 0.01 ml/g, the expansion coefficient at the time of capacitor charging will be large. If the volume is over 0.1 ml/g, the withstand voltage characteristic will be decreased. The volume of pores with a pore diameter of 0.8 nm or less can be determined by analysis of pore volume by the DFT (Density Functional Theory) method based on a high resolution adsorption isotherm of carbon dioxide (at 273K, $10^{-7}$ to 1 Torr) in carbon, which is the electrode material. The measuring apparatus used was an adsorption analyzer for micropore measurement, Autosorb-1-MP (with a turbomolecular vacuum pump) manufactured by Quantachrome Instruments.

Carbonaceous electrodes can be prepared by methods such as those conventional used. For example, in the preparation of a sheet-like electrode, nonporous carbon prepared by the above-mentioned method is pulverized to have a regulated particle size of approximately from 5 to 100 μm. Subsequently, an electrically-conductive aid for imparting electrical conductivity to a carbon powder, e.g., carbon black, and a binder, e.g., polytetrafluoroethylene (PTFE) are added to the pulverized nonporous carbon and then the mixture is kneaded and extended with pressure into a sheet form.

Besides carbon black, powdery graphite may be used as an electrically-conductive aid. Examples of available binders besides PTFE, include PVDF, PE and PP. The mixing ratio of the nonporous carbon to the electrically-conductive aid (carbon black) to the binder (PTFE) is typically about 10 to 1/0.5 to 10/0.5 to 0.25.

The prepared carbonaceous electrodes for electric double layer capacitors can be used in electric double layer capacitors having a structure conventionally known. Structures of electric double layer capacitors are shown, for example, in FIGS. 5 and 6 of Japanese Patent Laid-open Publication No. H11(1999)-317333, FIG. 6 of Japanese Patent Laid-open Publication No. 2002-25867, and FIGS. 1 to 4 of Japanese Patent Laid-open Publication No. 2000-77273. Generally, such an electric double layer capacitor can be assembled by superposing sheet-like carbon electrodes via a separator to form a positive and negative electrodes, and then impregnating the electrodes with an electrolytic solution.

As the electrolytic solution, a so-called organic electrolytic solution prepared by dissolving an electrolyte as a solute in an organic solvent may be used. As the electrolyte, substances usually used by persons skilled in the art, e.g., tetrafluoroborate or hexafluorophosphate of lower aliphatic quaternary ammonium, lower aliphatic quaternary phosphonium or imidazolinium derivative, which are disclosed in Japanese Patent Laid-open Publication No. 2000-77273, may be used.

Particularly preferable electrolytes are salts of pyrrolidinium compounds. Preferable pyrrolidinium compound salts have a structure shown by the formula:

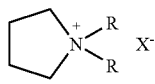

wherein R is each independently an alyl group or R and R form together an alkylene group, and X⁻ is a counter anion. Pyrrolidinium compound salts are conventionally known and any one prepared by a method known to those skilled in the art may be used.

Preferable ammonium components in the pyrrolidinium (compound salts are those wherein in the formula given above R is each independently an alkyl group having from 1 to 10 carbon atoms or R and R form together an alkylene group having from 3 to 8 carbon atoms. Substances in which R and R form together an alkylene group having 4 or 5 carbon atoms are more preferable. Substances R and R form together a butylene group are even more preferable. Such ammonium components are called spirobipyrrolidinium (SBP).

Pyrrolidinium compounds, especially spirobipyrrolidiniums, have apparently complex molecular structures and seem to large ion diameters. However, use of this type of compounds as electrolyte ions of an organic electrolytic solution will produce a particularly great effect of preventing the expansion of the nonporous carbonaceous electrode as the negative electrode and will greatly improve the energy density of the electric double layer capacitor. Although any theoretical limitation is not intended, it is conceivable that pyrrolidinium compounds and spirobipyrrolidiniums have small effective ion diameters because the spread of an electron cloud is suppressed by a spiro ring structure.

The counter anion X⁻ may be any one which has heretofore been used as an electrolyte ion of an organic electrolytic solution. Examples include a tetrafluoroborate anion, a fluoroborate anion, a fluorophosphate anion, a hexafluorophosphate anion, a perchlorate anion, a borodisalicylate anion and a borodioxalate anion. Preferable counter anions are a tetrafluoroborate anion and a hexafluorophosphate anion because these have low molecular weights and simple structures and the expansion of the nonporous carbonaceous electrode as the positive electrode is suppressed.

When the aforesaid pyrrolidinium compound salt is dissolved in an organic solvent as a solute, an organic electrolytic solution for electric double layer capacitors is obtained. The concentration of the pyrrolidinium compound salt in the resulting organic electrolytic solution is adjusted to from 0.8 to 3.5 mol %, and preferably from 1.0 to 2.5 mol %. If the (concentration of the pyrrolidinium compound salt is less than 0.8 mol %, the number of ions contained is not sufficient, resulting in an insufficient capacitance. A concentration over 2.5 mol % causes no benefits because it does not contribute to capacitance.

Pyrrolidinium compound salts may be used alone or as mixtures of two or more kinds of them. Such electrolytes may be used together with electrolytes conventionally employed for organic electrolytic solutions. The ratio of the pyrrolidinium compound salt in the solutes is at least 50% by weight, and preferably 75% by weight or more of the overall weight of the solutes. Examples of electrolytes preferably used together with pyrrolidinium compound salts include triethylmethylammonium salts and tetraethylammonium salts.

As the organic solvent, ones which have heretofore been used for organic electric double layer capacitors may be used. For example, ethylene carbonate (EC), propylene carbonate (PC), γ-butyrolactone (GBL) and sulfolane (SL) are preferable because of their high dissolveability of pyrrolidinium compound salts and their high safety. Solvents including these as main solvent and at least one auxiliary solvent selected from dimethyl carbonate (DMC), ethylmethyl carbonate (EMC) and diethyl carbonate (DEC) are also useful because the low-temperature characteristics of electric double layer capacitors are improved. Use of acetonitrile (AC) as an organic solvent is preferable from the viewpoint of performances because it improves conductivity of electrolytic solutions. However, in some cases, applications are restricted.

Use of a combination of a nonporous carbonaceous electrode produced by using needle coke as a raw material and an electrolyte containing a pyrrolidinium compound salt will produce a remarkable effect of suppressing the expansion of a negative electrode, resulting in a great improvement in energy density of an electric double layer capacitor.

The present invention will be described in more detail below with reference to Examples, but the invention is not limited thereto. Note that the amounts expressed in "part(s)" or "%" in the Examples are by weight unless otherwise stated.

EXAMPLES

Preparation Example 1

Pellets of potassium hydroxide were pulverized in a mill into a powder. A coal-origin needle coke green powder (NCGP) produced by The Japan Steel Works, Ltd. was placed in an alumina crucible. It was calcined in a muffle furnace at about 800° C. for 3 hours under circulation of nitrogen, and then cooled spontaneously. The calcined product was mixed with 1.5 times in weight of the potassium hydroxide powder. This was divided into nickel crucibles, which were then covered with nickel lids to isolate the external atmosphere. These were activated in a muffle furnace at 750° C. for 4 hours under circulation of nitrogen. Each calcined product was taken out and washed with pure water lightly, followed by ultrasonic washing for one minute. Then, water was separated by using a Buchner funnel. The same washing operation was repeated until the pH of washings became about 7. The resultant was dried in a vacuum drier at 200° C. for 10 hours.

The resulting carbon was pulverized for one hour with 10 mm$\phi$ alumina balls in a ball mill (AV-1, manufactured by Fujiwara Scientific Co., Ltd.). Measurement of particle size by a Coulter counter showed that every powder had a central particle diameter of about 10 μm. The specific surface areas of the resulting carbon powders were measured by the BET method and were found to be 80 $m^2/g$. The volume of pores with a pore diameter of 0.8 nm or less was 0.04 ml/g.

The powdery carbon (CB) was mixed with acetylene black (AB) and polytetrafluoroethylene powder (PTFE) so that the mixing ratio became 10:1:1, and then kneaded in a mortar. In about 10 minutes, the PTFE was extended into a flake, which was then pressed with a press machine. Thus, a 300 μm thick carbon sheet was obtained.

Figure 4:
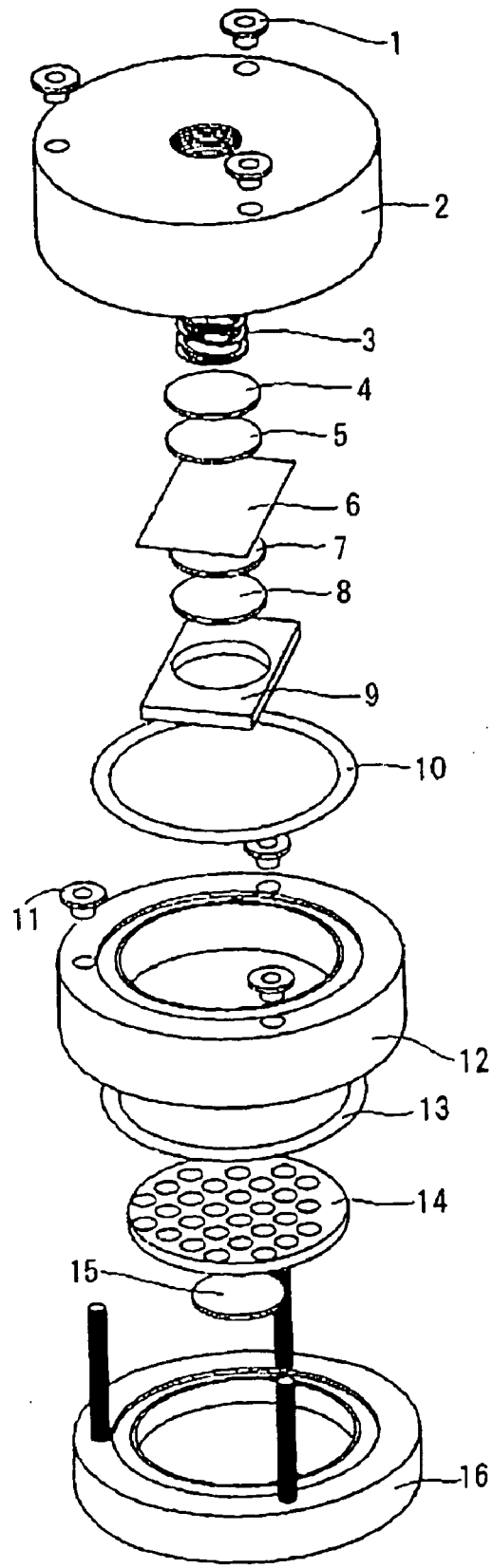
FIG. 4 is an assembling diagram showing the structure of the electric double layer capacitor of the Example.

Discs with a diameter of 20 mm$\phi$ were punched out of the resulting carbon sheet and then were used to fabricate a three-electrode cell as shown in FIG. 4. The discs contains 83.3% of nonporous carbon. A sheet prepared by sheeting activated carbon #1711 in a manner similar to those mentioned above, was used as a reference electrode. The cell was dried in a vacuum at 220° C. for 24 hours, and then cooled. An electrolytic solution was prepared by dissolving spirobipyrrolidinium tetrafluoroborate ($SBPBF_4$) into propylene carbonate to a concentration of 2.0 mol %. The resulting electrolytic solution was poured into the cell to produce the cells of electric double layer capacitors.

Measurement of Electrostatic Capacitance-developing Voltage (Ve)

Figure 5:
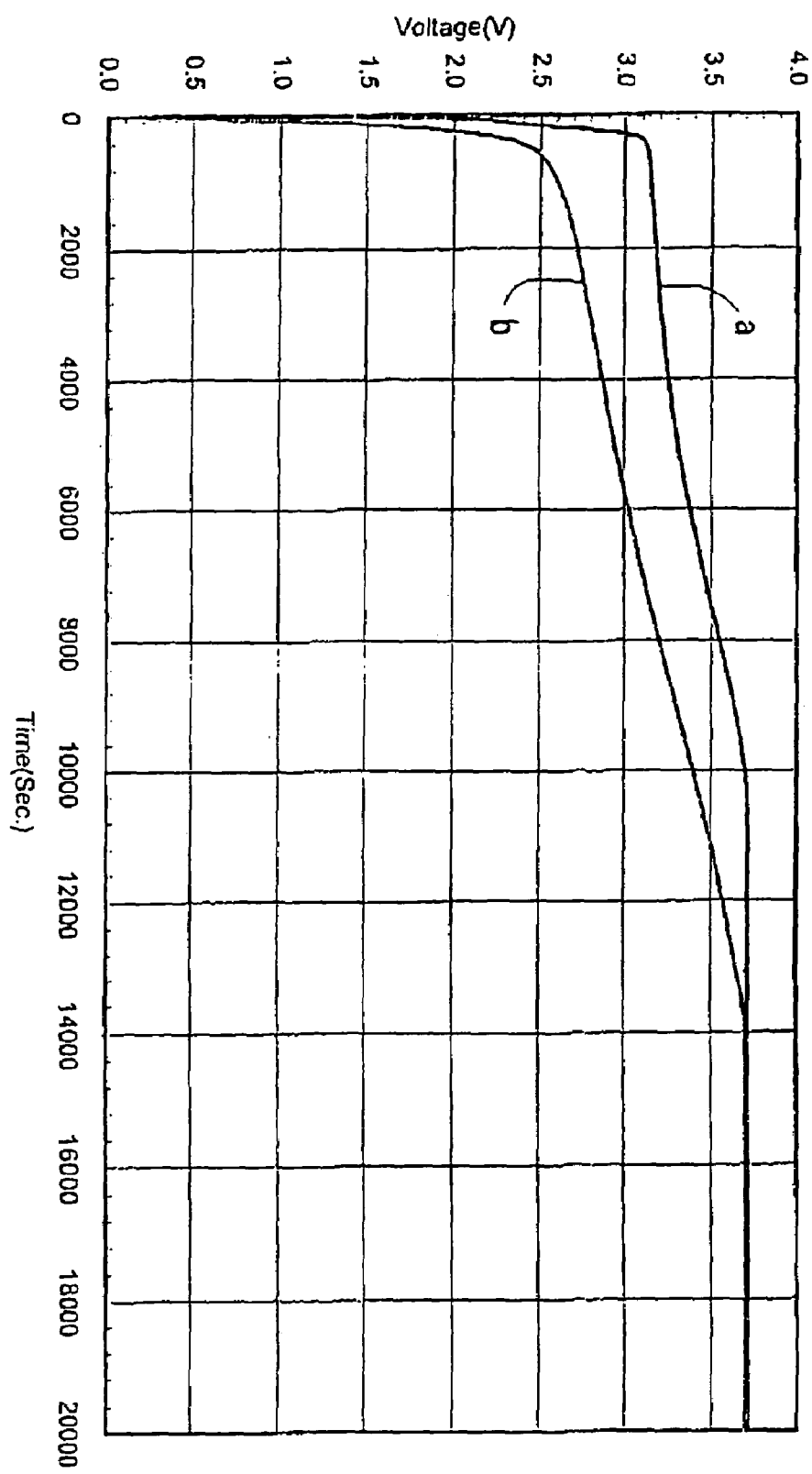
FIG. 5 is a graph showing voltage changes with time of capacitor cells of the preparation examples through constant current and constant voltage charging on a constant current of 1 $mA/cm^2$.

The CCCV charging on a constant current of 1 $mA/cm^2$ was conducted with the three-electrode cell until the terminal voltage increases over the rated voltage (until 3.7 V). Curve (a) in FIG. 5 shows voltage changes with time through the charging. Ve was determined based on the curve (a) to be 2.7 V.

Preparation Example 2

An additional kind of nonporous carbon was prepared according to substantially the same manner as that described in Preparation Example 1, except that the calcination conditions were modified. The nonporous carbon was processed into electrode disks, and the electrode disks were assembled to three electrode cells as shown in FIG. 4. The CCCV charging was conducted with the cell, and the charging curve (b) in FIG. 5 was obtained. Ve was determined based on the curve (b) to be 1.8 V.

Examples and Comparative Example

The rated voltage for the capacitor cells was determined to 3.5 V. A charging/discharging tester "CDT-RD20" manufactured by Power Systems Co., Ltd. was connected to a capacitor cell prepared in the preparation examples, aced constant current charging was conducted at a constant current of 1 $mA/cm^2$ until the interelectrode voltage reached "charging voltage 1". Then, while keeping this voltage, constant voltage charging was carried out until "charging time 1" was completed. Further, constant current charging was conducted at a constant current of 1 $mA/cm^2$ until the interelectrode voltage reached. "charging voltage 2". Subsequently, while keeping this voltage, constant voltage charging was carried out until "charging time 2" was completed. Thereafter constant current discharging was conducted at a constant current of 1 $mA/cm^2$.

Figure 3:
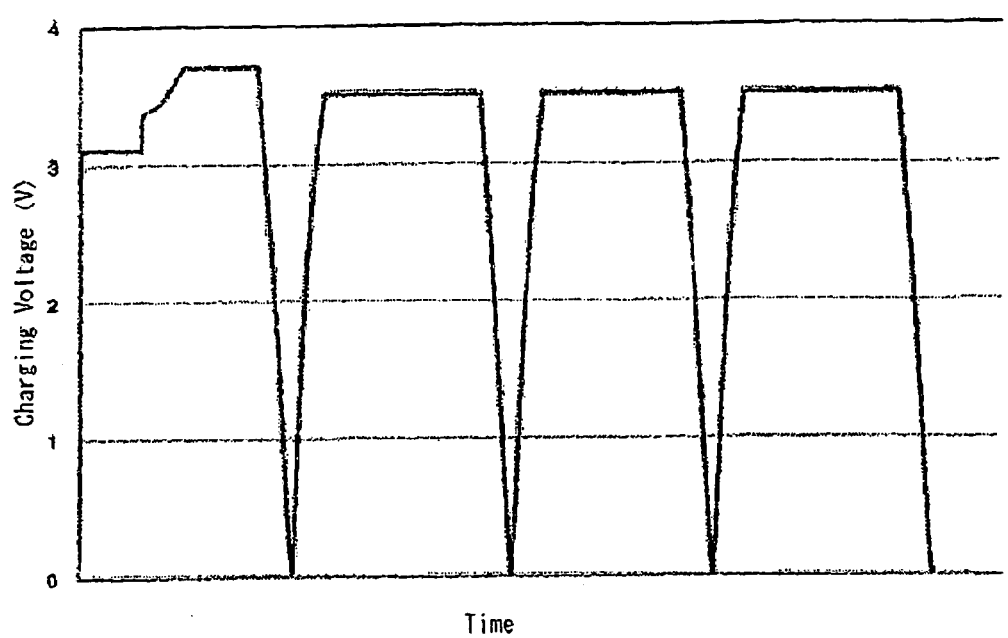
FIG. 3 is a graph showing one example of a charging/discharging curve of an electric double layer capacitor in the electric activation method of the present invention.

Subsequently, charging and discharging were repeated three cycles under conditions including a rated current of 1 $mA/cm^2$ and the rated voltage of 3.5 V. FIG. 3 is a graph showing one example of a charging/discharging curve of an electric double layer capacitor in the electric activation method of the present invention.

The electrostatic capacitance in the third cycle was determined by the energy conversion method, which is a method for determining an electrostatic capacitance on the basis of the integrated discharged power. The value obtained by dividing the electrostatic capacitance by the total of the volumes of the polarizing electrodes, was used as a volumetric capacitance (F/cc). A value obtained by dividing a voltage drop detected in a state where an electric current is rising up immediately after the commencement of discharging by a discharged current at that time, was vised as an initial internal resistance. The charging conditions and measurement results are shown in Table 1.

TABLE 1

| | Capacitor cell | Charging voltage 1 (V) | Charging time 1 (s) | Charging voltage 2 (V) | Charging time 2 (s) | Volumetric capacitance (F/cc) | Internal resistance (Ω) |
|---|---|---|---|---|---|---|---|
| Example 1 | Prep. Ex. 1 | 2.0 | 3600 | 3.7 | 3600 | 21.2 | 6.3 |
| Example 2 | Prep. Ex. 1 | 3.1 | 3600 | 3.7 | 3600 | 25.3 | 5.3 |
| Example 3 | Prep. Ex. 1 | 3.4 | 3600 | 3.7 | 3600 | 26.3 | 5.4 |
| Example 4 | Prep. Ex. 1 | 3.4 | 3600 | 4.2 | 3600 | 24.5 | 11.6 |
| Example 5 | Prep. Ex. 1 | 3.1 | 3600 | 3.7 | 3600 | 26.5 | 4.9 |
| Example 6 | Prep. Ex. 1 | 3.1 | 3600 | 3.7 | 7200 | 28.0 | 5.8 |
| Example 7 | Prep. Ex. 1 | 3.1 | 3600 | 3.7 | 25200 | 26.3 | 7.9 |
| Example 8 | Prep. Ex. 1 | 3.1 | 2400 | 3.7 | 3600 | 24.5 | 5.9 |
| Example 9 | Prep. Ex. 1 | 3.1 | 1200 | 3.7 | 3600 | 24.5 | 6.1 |
| Example 10 | Prep. Ex. 1 | 3.1 | 600 | 3.7 | 3600 | 24.1 | 6.2 |

TABLE 1-continued

|  | Capacitor cell | Charging voltage 1 (V) | Charging time 1 (s) | Charging voltage 2 (V) | Charging time 2 (s) | Volumetric capacitance (F/cc) | Internal resistance (Ω) |
|---|---|---|---|---|---|---|---|
| Example 11 | Prep. Ex. 1 | 3.1 | 60 | 3.7 | 3600 | 24.3 | 6.2 |
| Example 12 | Prep. Ex. 1 | 3.1 | 3600 | 3.7 | 3600 | 24.3 | 5.8 |
| Comp. Ex. 1 | Prep. Ex. 1 | 3.5 | 86400 | 4.0 | 1200 | 25.1 | 12.8 |
| Comp. Ex. 2 | Prep. Ex. 1 | — | 0 | 3.7 | 7200 | 20.1 | 6.4 |
| Comp. Ex. 3 | Prep. Ex. 1 | — | 0 | 3.7 | 25200 | 24.2 | 10.7 |
| Comp. Ex. 4 | Prep. Ex. 1 | — | 0 | 4.0 | 25200 | 24.8 | 14.2 |
| Example 13 | Prep. Ex. 2 | 2.3 | 3600 | 3.7 | 3600 | 26.5 | 4.5 |
| Example 14 | Prep. Ex. 2 | 2.5 | 3600 | 3.7 | 3600 | 27.2 | 4.7 |
| Example 15 | Prep. Ex. 2 | 2.5 | 3600 | 3.7 | 7200 | 28.6 | 5.2 |
| Comp. Ex. 5 | Prep. Ex. 2 | 3.5 | 86400 | 4.0 | 1200 | 24.6 | 12.5 |
| Comp. Ex. 6 | Prep. Ex. 2 | — | 0 | 4.0 | 25200 | 25.2 | 14.0 |

What is claimed is:

1. A method for conducting electric activation of an electric double layer capacitor comprising:

providing an electric double layer capacitor in which nonporous carbonaceous electrodes containing graphite-like fine crystalline carbon are soaked in an organic electrolytic solution;

charging the electric double layer capacitor at a constant current until the interelectrode voltage reaches a predetermined voltage which is not lower than the electrostatic capacitance developing voltage but lower than the rated voltage;

conducting constant voltage charging for a predetermined time during which ions of solutes in the organic electrolytic solution are conceived to be adsorbed uniformly on the surface of the fine crystalline carbon at that predetermined voltage;

conducting constant current charging until the interelectrode voltage reaches a predetermined voltage which is not lower than the rated voltage but is not higher than the decomposition voltage of the electrolytic solution; and conducting constant voltage charging for a predetermined time during which ions of solutes in the organic electrolytic solution are conceived to be inserted uniformly to between layers of the fine crystalline carbon at that predetermined voltage.

2. The method according to claim 1, wherein the predetermined voltage which is the end point of the fast constant current charging step is from the electrostatic capacitance developing voltage to 0.1 V lower voltage than the rated voltage.

3. The method according to claim 1, wherein the predetermined voltage which is the end point of the first constant current charging step is from the electrostatic capacitance developing voltage to 0.4 V lower voltage than the rated voltage.

4. The method according to claim 1, wherein the predetermined time in the first constant voltage charging step is from 60 to 3600 seconds.

5. The method according to claim 1, wherein the predetermined voltage which is the end point of the second constant current charging step is from the rated voltage to 0.7 V higher voltage than the rated voltage.

6. The method according to claim 1, wherein the predetermined voltage which is the end point of the second constant current charging step is from the rated voltage to 0.2 V higher voltage than the rated voltage.

7. The method according to claim 1, wherein the predetermined time in the second constant voltage charging step is from 1800 to 28800 seconds.

* * * * *

UNITED STATES PATENT AND TRADEMARK OFFICE
CERTIFICATE OF CORRECTION

| | | |
|---|---|---|
| PATENT NO. | : 7,214,249 B2 | Page 1 of 1 |
| APPLICATION NO. | : 11/499801 | |
| DATED | : May 8, 2007 | |
| INVENTOR(S) | : Hidetoshi Ohta et al. | |

It is certified that error appears in the above-identified patent and that said Letters Patent is hereby corrected as shown below:

Column 14, Line 19, Claim 2:
    "fast" should be --first--

Signed and Sealed this

Twenty-fourth Day of July, 2007

JON W. DUDAS
*Director of the United States Patent and Trademark Office*